Figure 1:
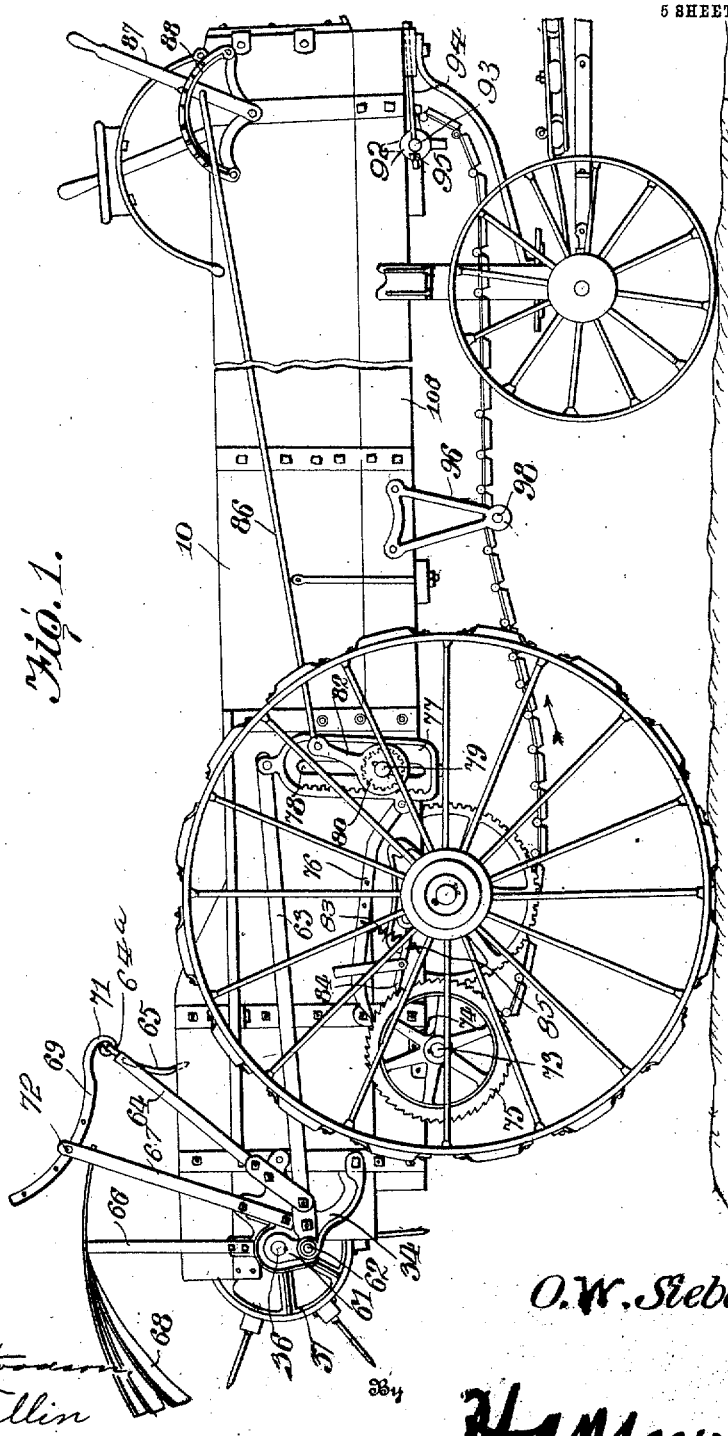

O. W. SIEBENHAAR.
FERTILIZER DISTRIBUTER.
APPLICATION FILED APR. 13, 1909.

959,628.

Patented May 31, 1910.
5 SHEETS—SHEET 4.

Witnesses
W. N. Woodson,
J. M. Fallin.

Inventor
O. W. Siebenhaar

By
M. A. Racey, Attorneys.

O. W. SIEBENHAAR.
FERTILIZER DISTRIBUTER.
APPLICATION FILED APR. 13, 1909.

959,628.

Patented May 31, 1910.
5 SHEETS—SHEET 5.

Witnesses

Inventor
O. W. Siebenhaar

By
Attorneys.

UNITED STATES PATENT OFFICE.

OTTO W. SIEBENHAAR, OF ROSENDALE, WISCONSIN, ASSIGNOR TO ROSENDALE SPREADER COMPANY, OF ROSENDALE, WISCONSIN.

FERTILIZER-DISTRIBUTER.

959,628.　　　Specification of Letters Patent.　　Patented May 31, 1910.

Application filed April 13, 1909. Serial No. 489,594.

*To all whom it may concern:*

Be it known that I, OTTO W. SIEBENHAAR, citizen of the United States, residing at Rosendale, in the county of Fond du Lac and State of Wisconsin, have invented certain new and useful Improvements in Fertilizer-Distributers, of which the following is a specification.

This invention relates to fertilizer distributers and has particular reference to the specific construction and formation of the same.

An object of this invention is the formation of a fertilizer distributer which when in operation will spread the fertilizer evenly upon the ground at the rear of the same the entire width of the wagon, the device being provided with means for deflecting the material laterally of the wagon from the rear thereof when the same is thrown backwardly by the revolving drum.

The invention has for another object the provision of a raking mechanism which is operated in conjunction with the device for automatically disengaging portions of the same which adhere in lump form or which tend to clog the teeth of the drum or cylinder during this operation so as to distribute the material in a fine spray to enable the even flow of the same from the device.

A further object of this invention is the provision of an improved device for feeding the material to the rear of the body or the wagon of the device and means connected to the feeding means for regulating the speed of the same so as to form a stream of the material the desired thickness from the wagon.

A still further object of the invention is the production of a device which is simple in construction and operation so as to produce a practical machine which is strong, durable, and one which cannot easily get out of order and in which access may be readily gained to the working parts so as to produce a machine which may be regulated and controlled by the driver from the seat of the wagon so as to cause an even distribution of the material of the desired thickness or to entirely cut out the operative parts of the vehicle when the same is being conveyed from one place to another.

The invention essentially comprises the complete novel construction in a device of this character and a novel combination of the elements which comprise the same as well as the novel coöperation of such elements to combine in one machine all the advantages as above set forth.

For a full understanding of the invention and the merits thereof reference is to be had to the following description and accompanying drawings, in which—

Figure 2:
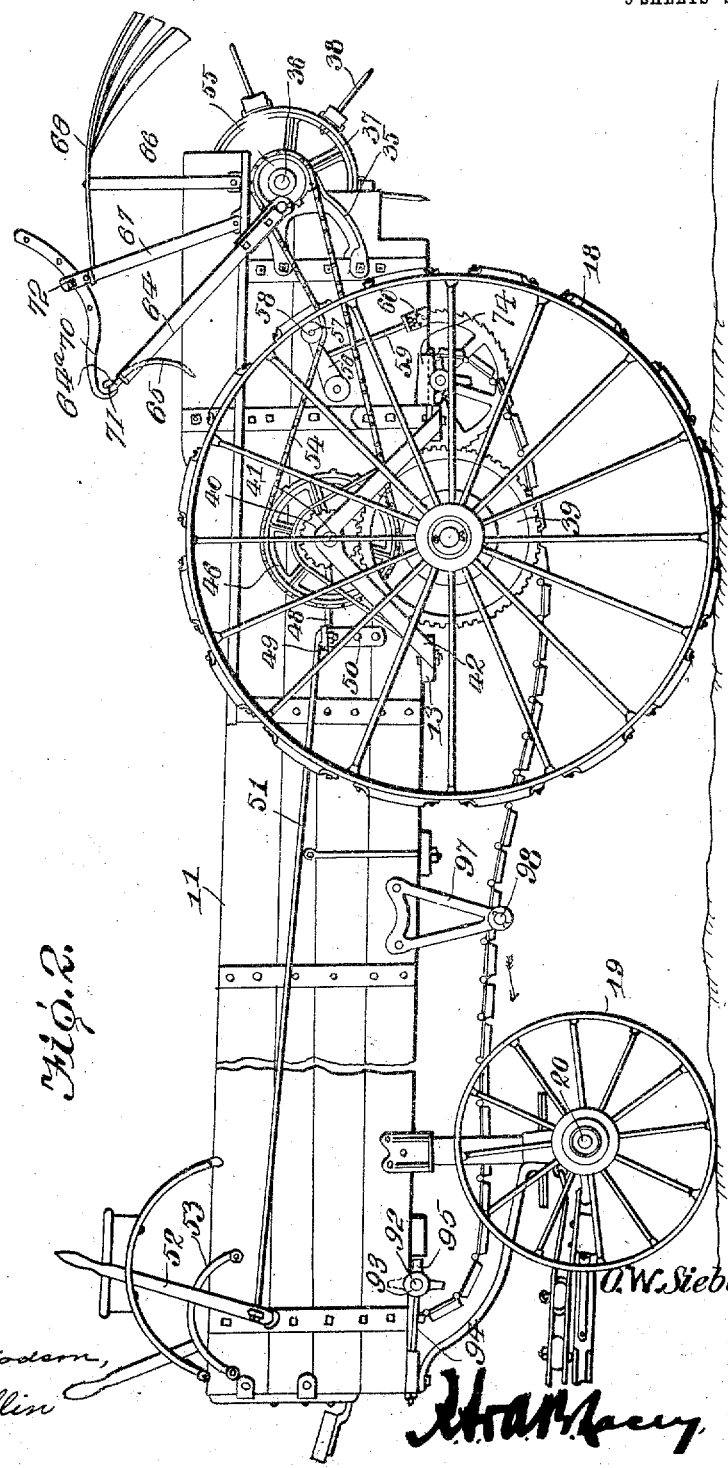
Figure 3:
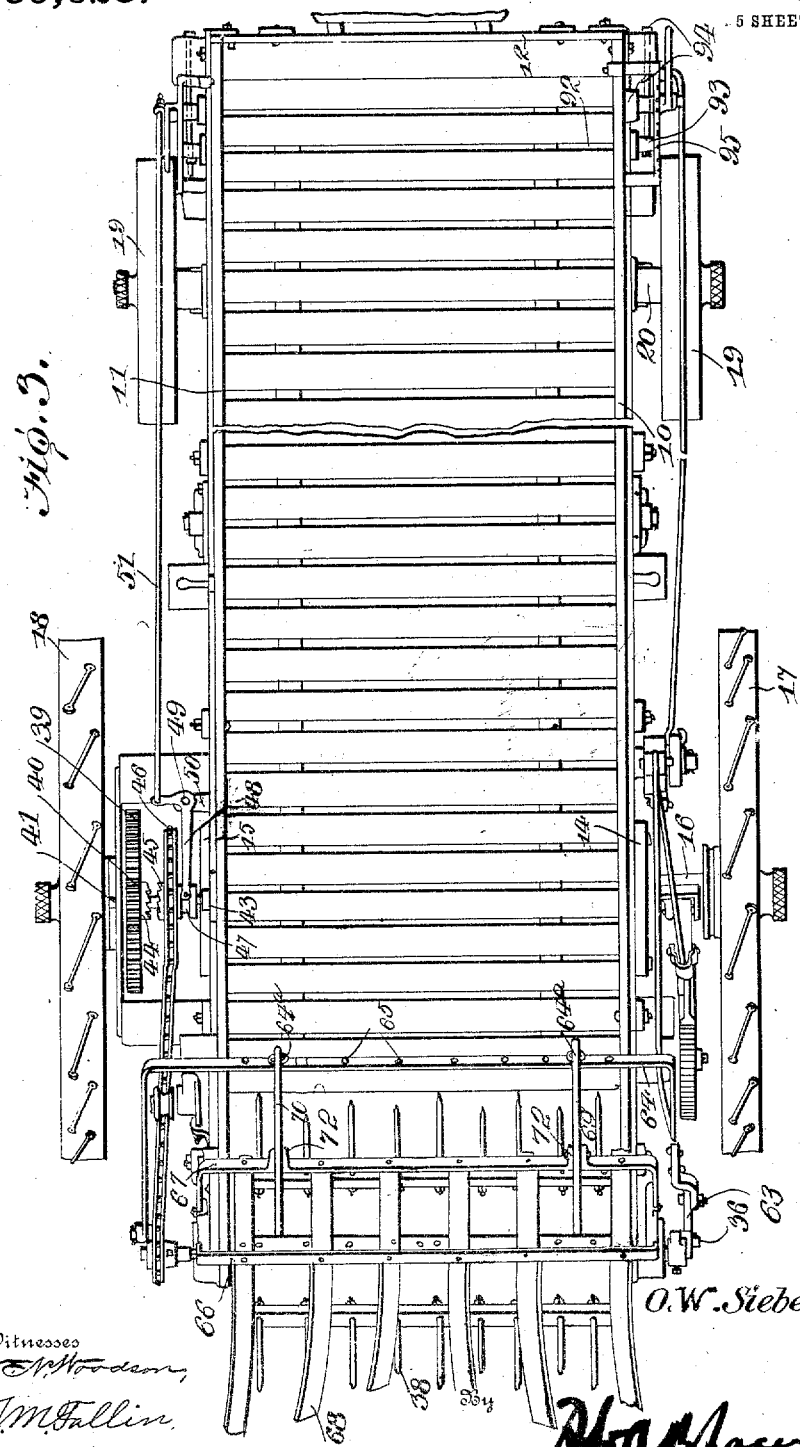
Figure 4:
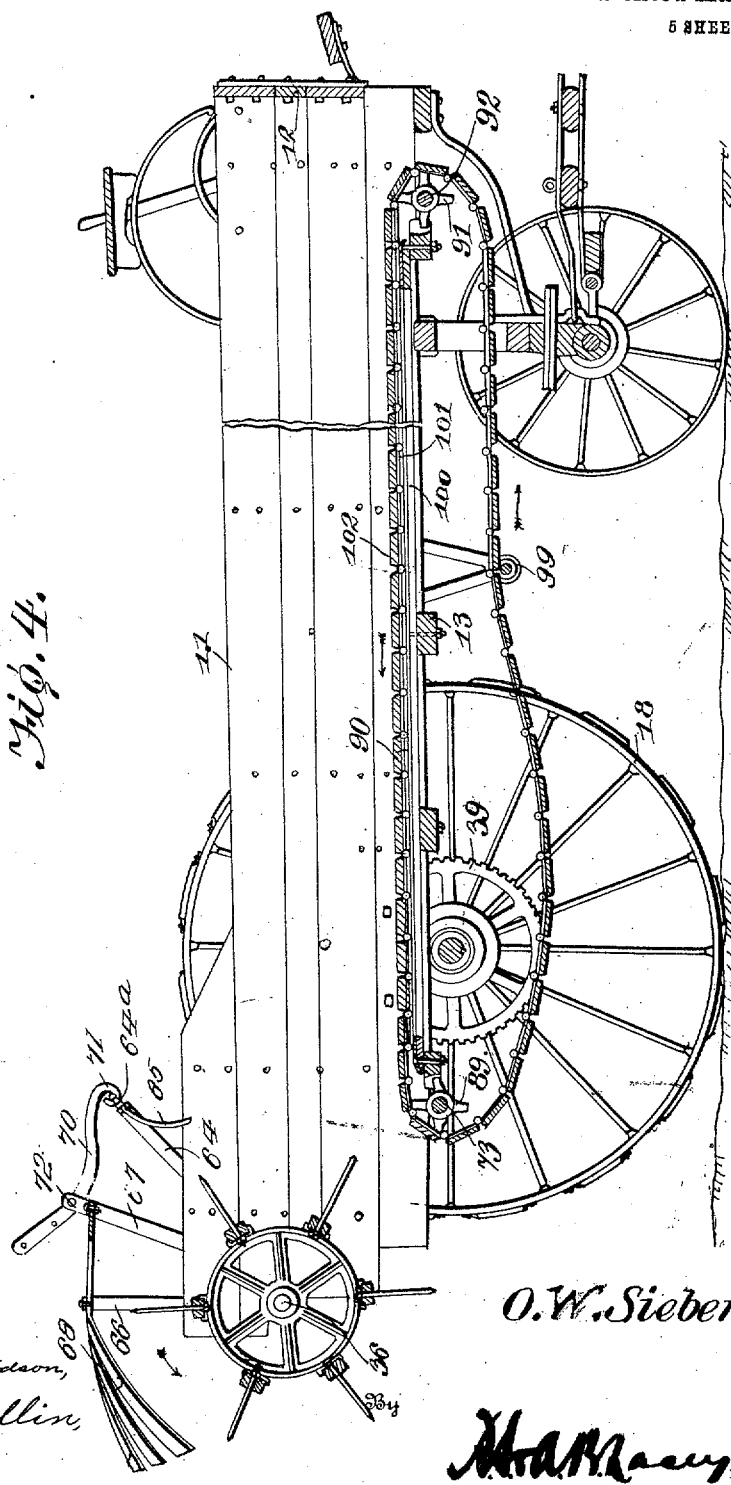
Figures 5, 6:
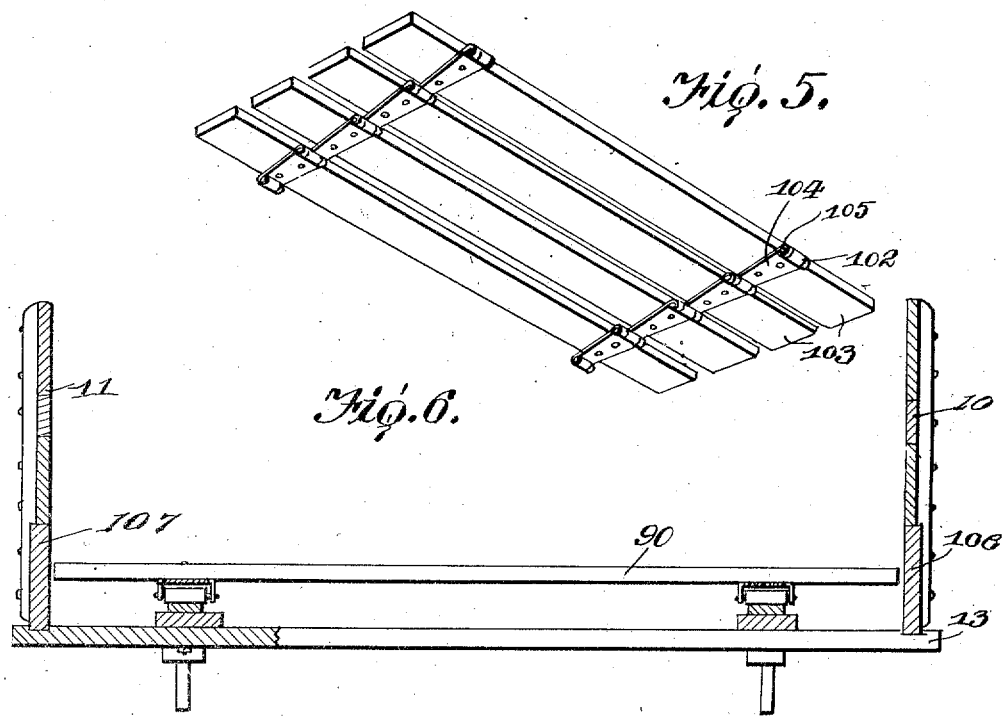

Figure 1 is a side elevation of the right side of the complete device, the wagon being broken centrally; Fig. 2 is a side elevation of the left side of the device, the same being disclosed as broken centrally; Fig. 3 is a top plan view of the same, the seat being removed from the forward end in order to disclose the endless bottom employed; Fig. 4 is a longitudinal vertical section through the same; Fig. 5 is a detailed perspective view of the under side of a section of the endless bottom showing the rollers and hinged points of the same; Fig. 6 is a transverse section through one end of the wagon disclosing the endless bottom and the mounting therefor.

Corresponding and like parts are referred to in the following description and indicated in all the views of the accompanying drawings by the same reference characters.

Referring to the drawings, the numerals 10 and 11 designate the two sides of the body portion or wagon of the device which is provided with the front end wall 12 which is suitably secured upon the same and which is reinforced and held in spaced parallel relation by the employment of a plurality of crss-braces 13 which are engaged across the lower edges of the same in equi-distant relation throughout the lengths of the sides 10 and 11. The sides 10 and 11 are provided adjacent their rear ends with depending brackets 14 and 15 through the lower ends of which are journaled a shaft or axle 16. The axle 16 carries upon its opposite extremities the traction wheels 17 and 18 which are provided with ratchet hubs of common construction to admit of the turning of the wheels and at the same time of the actuation of the shaft 16 by the rotation of the traction wheels 17 and 18. The forward end of the wagon is supported upon the wheels 19 which are mounted on the opposite extremities of an axle 20.

The rear extremities of the sides 10 and 11 are provided with brackets 34 and 35 respectively which are rearwardly extended therefrom in parallel and support through their outer extremities a shaft 36. The shaft 36 is rotatably disposed in the brackets 34 and 35 and is provided centrally with a drum or cylinder 37 which is provided with pluralities of teeth 38 which are transversely arranged across the periphery of the cylinder 37 and which are of alternate long and short lengths so as to engage more readily with the fertilizer as they strike the same upon the inner side of the wagon. The means employed for rotating the shaft 36 and drum 37 comprises a large gear wheel 39 which is rigidly carried upon the drive wheel 18 at the inner face thereof and meshes with a pinion 40 mounted upon the outer end of a stub-shaft 41 which is mounted in a V-shaped bracket 42 upwardly extended from the adjacent braces 13 which are projected laterally from the body of the wagon. The outer extremity of the stub-shaft 41 is secured in the bracket 42 while the inner extremity of the same is mounted in a boxing 43 carried upon the side 11.

The pinion 40 is keyed rigidly upon the shaft 41 and is provided on its inner face with a toothed collar 44 which is adapted for engagement with a second toothed collar 45 carried upon the outer face of a sprocket-wheel 46 which is loosely mounted upon the shaft 41 inwardly of the pinion 40. The sprocket wheel 46 carries a grooved sleeve 47 which loosely carries the outer end of a fork arm 48 of a bell crank lever 49, the opposite arm of which extends outwardly from a bracket 50 carried on the side 11 and is connected by a rod 51 to a hand-lever 52 which is mounted at the forward end of the wagon and locked in adjusted position by coöperation with a segment 53. The sprocket-wheel 46 is provided with a chain 54 which extends rearwardly and engages over a small sprocket 55 which is rigidly mounted on the outer end of the shaft 36 in approximate alinement with the sprocket-wheel 46.

A tension device is employed in connection with the chain 54 for regulating the same so as to prevent the jumping of the chain 54 from the sprockets 46 and 55 during the operation of the device. This tensional means comprises an arm 56 which is rigidly mounted on the side 11 and which is provided at its outer extremity with a laterally projecting pin 57 upon which is loosely disposed a roller 58 which engages with the upper face of the arm 56 as the same is passed over the sprockets 46 and 55. The arm 56 is retained in adjusted position by means of a threaded rod 59 which is disposed intermediately upon the arm 56 and extended downwardly therefrom where it is engaged through a lug 60 mounted adjacent the lower edge of the side 11 and adjustably retained through the same by means of a suitable nut. The opposite end of the shaft 36 is mounted in and extends through the bracket 34 where a crank arm 61 is rigidly positioned which is provided with a wrist-pin 62 upon which is pivotally connected the rear extremity of a pitman 63. The pitman 63 carries adjacent its rear end one arm of a U-shaped frame 64 which extends upwardly and across the sides 10 and 11 where its opposite arm is pivotally secured eccentrically upon the sprocket 55. This arrangement produces a vibratory motion of the U-shaped frame which carries prongs or tines 65 to form a rake for engagement with the material which is fed forwardly toward the sleeve 47. The prongs or tines 65 are secured throughout the length of the cross bar of the U-frame 64 in spaced relation and are extended downwardly therefrom, the prongs being curved downwardly and forwardly of the wagon to engage the fertilizer as it is carried upwardly by the cylinder 36. The wagon is further provided with supporting frames 66 and 67 which are of U-formation and are extended upwardly across the rear end of the sides 10 and 11 and are diverged at their upper ends to support a plurality of deflecting blades 68 which are oppositely and concentrically flared toward the sides of the wagon in order to deflect the material impinged against the same laterally and rearwardly of the wagon. The blades 68 are secured beneath the cross bars of the frames 66 and 67 by means of a plurality of rivets 68ᵃ the same being engaged through the frames 66 and 67 and through the rear extremities and the intermediate portions of the blades 68 where the same contact with the frame. These blades 68 are extended rearwardly from the frames 66 and 67 and are given a slight curve downwardly, the curvatures of the end blades being proportionately increased. The blades 68 are also bent laterally and longitudinally to advance the inner edges of the same below the outer edges, the degree of the bending of the blades being greater toward the ends thereof and in accordance with the outward position of the same. It is thus observed that the blades 68 are substantially arranged concentric to the cylinder 36 and that they extend from a point inwardly of and over the cylinder to a point rearwardly of the same.

The frames 66 and 67 are secured at their lower ends to the upper portions of the brackets 34 and 35 where they are rigidly retained in such position by clamping bolts or the like. The U-shaped frame 64 is held adjustably and loosely in an upward position through the medium of bars 69 and 70 which are looped at their forward ends as at 71 for engagement through eyes 64ᵃ formed in the opposite ends of the frame 64 and are provided at their rear extremities with series of apertures through which pivot pins 72 are engaged to adjustably and pivotally support the bars and to adjust the distance between the frames 64 and 67.

At the rear end of the wagon a shaft 73 is disposed which is rotatably retained in position by suitable brackets 74 which are extended downwardly from the sides 10 and 11 in parallel, the shaft 73 being provided upon one extremity, outwardly of the side 10 with a ratchet wheel 75 which is actuated intermittently by a pawl 76 which is pivotally connected at its forward extremity to a rocking member 77, the opposite extremity of the rocking member 77 being pivotally connected to the pitman 63 through the medium of which the rocking member 77 receives its motion. The rocking member 77 comprises an elongated body portion having a chamber formed longitudinally therein and a longitudinal slot 78 through which a stud 79 is projected and upon which stud a pinion 80 is loosely mounted which engages with a rack 81 longitudinally formed in one side of the inner face of the rocking member 77.

The pinion 80 is provided with a collar which extends outwardly through the outer longitudinal slot 78 and is rigidly connected to an arm 82 which projects upwardly and radially therefrom. The bracket 14 which is carried upon the side 10 adjacent the pawl 76 is provided with a projection which supports the lower extremity of a spring 83 which is engaged at its upper extremity through an intermediate point of the pawl 76 in order to tensionally retain the same in engagement with the ratchet wheel 75. For the purpose of locking the ratchet 75 from backward movement upon the withdrawal of the pawl 76 by the rocking member 77 a locking pawl 84 is provided which is pivotally secured to the bracket 14 and extended rearwardly where it is engaged with the teeth of the ratchet 75 and retained in such engagement by the provision of a spring 85.

The arm 82 is retained in various angles in order to adjust the point of support of the rocking member 77 by means of a rod 86 which is extended forwardly from the upper end thereof and engaged with a hand lever 87 which coöperates with a segment 88 to secure the rod 86 in various positions. The shaft 72 is provided intermediately with sprockets 89 which are secured thereon in spaced relation and which support an endless bottom 90 which is longitudinally positioned between the sides 10 and 11 and supported at the forward extremity of the wagon upon sprockets 91 which are mounted in spaced relation upon a transverse shaft 92. The transverse shaft 92 is retained in position beneath the forward end of the wagon in boxings 93 which are supported upon the rear or inner extremities of threaded bolts 94 which adjustably hold the boxings 93 through the medium of adjusting nuts 95 which are disposed in threaded engagement upon the inner ends of the bolts 94 and abut against the boxings 93. The shaft 92 is thus adjusted for the purpose of regulating the tension of the bottom 90 and of preventing the lag of the same beneath the vehicle. The sides 10 and 11 are provided intermediately with depending supports 96 and 97 which carry in their lower extremities a transverse rod 98 upon which is disposed a roller 99 which extends practically the entire length of the rod 98 and serves the purpose of supporting the endless bottom 90 beneath the wagon. The wagon is provided longitudinally with strips 100 upon which are disposed rails 101 which are formed of metal and which are curved downwardly at their opposite ends adjacent the sprockets 89 and 92 respectively. The strips 100 are engaged across the braces 13 in spaced relation and are adapted to register with rollers 102 which are carried by the endless bottom 90 for the purpose of reducing the frictional contact of the same with the rails 101.

The endless bottom 90 comprises a plurality of boards 103 which are transversely arranged in spaced relation and secured in such position by means of straps 104 which are disposed against the under face thereof and hingedly engaged at their opposite extremities with one another by the provision of pintles 105 upon which the rollers 102 are mounted. The rollers 102 are disposed at the adjoining edges of the straps 104 which are so spaced as to admit of the engagement of the rollers against the teeth of the sprockets 89 and 91 through the medium of which motion is imparted to the endless bottom 90 intermittently by the ratchet 75.

In the construction of the wagon the sides 10 and 11 are preferably provided with enlarged strips 106 and 107 which are secured adjacent the lower edges of the same and extended longitudinally thereof to support the several brackets which are secured to the sides 10 and 11 to insure rigidity and strength and to prevent displacement of any of the parts incident to the straining of the machine.

The operation of the device is as follows: When the wagon is set in motion and it is desired to operate the cylinder 37 the handle 52 is thrown forwardly and secured in interlocked engagement with the segment 53 which movement draws the rod 51 forwardly and swings the bell crank lever 49 to throw the forked arm 48 thereof outwardly and to thereby cause the sprocket wheel 46 and toothed sleeve 45 to engage the toothed sleeve 45 against the toothed sleeve 44. This arrangement causes the sprocket 46 to be revolved through the medium of the pinion 40 and large gear 39 and to thereby set the cylinder 37 in motion through the operation of the chain 54 and sprocket 55. As the cylinder 37 is rotated the raking mechanism which is mounted upon the U-shaped frame 64 is gyrated by reason of its connection eccentrically with the opposite ends of the shaft 36 and thereby causes the tines 65 to engage in the material which is positioned within the wagon body and to operate and distribute the same evenly upon the teeth 38 of the drum 37.

As the shaft 36 is rotated the arm 61 is caused to travel therewith and consequently the pitman 63 is vibrated to cause the rocking of the member 77 about the stud 79 as a pivot point which causes the reciprocation of the pawl 76 which alternately engages with and rotates and retracts in sliding engagement with the teeth of the ratchet 75 to impart an intermittent rotary motion of the same. The ratchet wheel 75 is provided with a locking pawl 84 which prevents the backward movement of the same, as such movement is produced by the backing of the material carried upon the endless bottom 90 against the cylinder 37 and thus produces a continued intermittent rotation of the shaft 73 which carries the sprockets 89 to engage with the rollers 102 of the endless bottom 90 and to thereby positively actuate the same. The distance through which the pawl 75 travels when operated to rotate the shaft 75 is regulated by the shifting of the pivot point of the rocking member 77 which is effected through the swinging of the arm 82 to rotate the pinion 80 to move the rocking member 77 longitudinally and to thereby cause a change of the center of rotation of the same and to change the relative lengths of the reciprocating arms of the member 77, which arrangement produces either a long or a short stroke of the pawl 76 relative to the pitman 63. The arm 82, it is readily observed from the drawings, is regulated by the hand lever 87 which is secured in adjusted position to the segment 88, through the medium of the rod 86 which is disposed between the hand lever 87 and the arm 82. The opposite ends of the rails 101 are beveled for the purpose of presenting a smooth contact for the rollers 102 of the endless bottom 90 to permit of the easy riding of the same thereover during the operation of the device.

It is noted that from the positioning of the deflectors 68 that when the material is thrown backwardly over the cylinder 37 it will strike the same and be thrown outwardly according to the angles at which the deflectors 68 are curved thereby scattering the material the entire width of the wagon.

Having thus described the invention, what is claimed as new is:

1. A device as specified comprising a body portion, a cylinder mounted on said body portion, means disposed between said cylinder and said body portion for actuating said cylinder, a U-shaped frame eccentrically connected at its opposite ends to said cylinder, a plurality of tines depended from said U-shaped frame for engagement in material in said body portion, two frames upwardly extended and diverged from said body portion over said cylinder, supporting bars loosely and adjustably positioned between said U-shaped frame and the inner of said diverged frames for supporting said U-shaped frame and a plurality of deflectors carried by said diverged frame and extended rearwardly from the same to direct material thrown upon said cylinder laterally of said body portion.

2. A fertilizer distributer including a body, a cylinder mounted in said body, a pitman mounted on said body, and connected to one end of said cylinder, and actuated by the same, a pinion carried by the opposite end of said cylinder, a U-shaped frame mounted on said body, the arms of said frame being respectively pivotally connected to said pitman and said pinion at points differently distant from the axis of said cylinder for producing vibration of said frame, tines depended from the cross bar of said frames and means disposed on said body for adjustably supporting the upper end of said frame.

3. A fertilizer distributer including a body, a pair of U-shaped frames extended over the end of said body, a plurality of metallic strips carried by said frames and extended rearwardly therefrom, said strips being curved downwardly and being twisted transversely to form a deflector, the strips being decreased in curvature consecutively from the central portion of said body.

4. A fertilizer distributer having a body and a cylinder mounted in the body in combination with a plurality of deflectors disposed on said body above said cylinder, said deflectors being extended rearwardly and downwardly over said cylinder, and being twisted at their outer ends to approach vertical planes, the deflectors toward the sides of the body being bent downwardly and being twisted to a less degree as they are removed from the center of the body.

5. A fertilizer distributer having a plurality of deflectors arranged transversely, the deflectors being curved backwardly and downwardly and being twisted to approach vertical planes, the outer of said deflectors being curved and twisted to a less degree proportionate to the outward positions of the same.

6. A fertilizer distributer including a body, a cylinder located in the rear portion of said body and a diverged deflector carried by said body over said cylinder and extending upwardly and outwardly from the middle of said body, said deflector being formed from a plurality of curved and twisted strips.

7. A fertilizer distributer including a body, a cylinder mounted in said body, and a plurality of deflectors arranged transversely on said body over said cylinder, said deflectors being consecutively curved and twisted to a less degree from the middle of the cylinder.

8. A fertilizer distributer including a body, a cylinder located in the body, a rake carried by said body over said cylinder, a U-shaped frame connected to said rake, the ends of said frame being extended downwardly and connected to said cylinder at points differently distant from the axis thereof and means for rotating said cylinder.

9. A fertilizer distributer including a body, a cylinder carried by said body, a rake extended over said cylinder, a U-shaped frame for supporting said rake, the ends of said U-shaped frame being connected to said cylinder at points differently distant from the axis thereof and means for rotating said cylinder.

In testimony whereof I affix my signature in presence of two witnesses.

OTTO W. SIEBENHAAR. [L. S.]

Witnesses:
A. C. PERRY,
JAMES R. HATCH.